United States Patent
Morinaka et al.

(10) Patent No.: US 6,464,070 B1
(45) Date of Patent: Oct. 15, 2002

(54) LINEAR CONVEYOR AND METHOD FOR CONTROLLING THE SAME

(75) Inventors: Hiroaki Morinaka, Kurita-gun; Takayuki Koizumi; Nobutaka Tsujiuchi, both of Kyotanabe, all of (JP)

(73) Assignee: Ishida Co. Ltd., Kyoto (JP)

( * ) Notice: Subject to any disclaimer, the term of this patent is extended or adjusted under 35 U.S.C. 154(b) by 0 days.

(21) Appl. No.: 09/959,925

(22) PCT Filed: Mar. 12, 2001

(86) PCT No.: PCT/JP01/01925

§ 371 (c)(1),
(2), (4) Date: Nov. 13, 2001

(87) PCT Pub. No.: WO01/68488

PCT Pub. Date: Sep. 20, 2001

(30) Foreign Application Priority Data

Mar. 14, 2000 (JP) .................................. 2000-069837
Mar. 14, 2000 (JP) .................................. 2000-069838

(51) Int. Cl.[7] .............................................. B65G 27/32
(52) U.S. Cl. ........................ 198/761; 198/762; 198/751
(58) Field of Search ............................... 198/751, 752.1, 198/761, 762, 758, 766

(56) References Cited

U.S. PATENT DOCUMENTS 4,553,616 A * 11/1985 Haze ..................... 198/761 X
5,054,606 A * 10/1991 Musseroot .............. 198/762 X

FOREIGN PATENT DOCUMENTS

JP 9-142631 6/1997
JP 10-221239 8/1998

* cited by examiner

Primary Examiner—James R. Bidwell
(74) Attorney, Agent, or Firm—Staas & Halsey LLP

(57) ABSTRACT

A plurality of trough displacement characteristics and drive signals for driving a drive unit 26 for a trough 25 are determined in association with each other and the speed of transport of the articles M transported by the trough 25 having one of the trough displacement characteristics is also determined. Accordingly, a plurality of relationships between the transport speed of the articles M and the drive signal of the drive unit 26 can be determined and, based on these relationships and merely by inputting a target speed to be attained by the articles M, the drive signal for the drive unit 26 can easily be selected which enables the speed of transport of the articles M to attain the target speed. Also, since a travel quantity characteristics indicative of a correspondence between the quantity of travel of the articles and the driving time of the trough 25 with respect to each of parameters of the plural coefficients of kinetic friction $\mu$ is determined, the quantity of travel of the articles M with respect to the driving time of the trough 25 can be grasped with respect to the plural coefficients of kinetic friction $\mu$ taken as a parameter. Based on this, the coefficient of kinetic friction $\mu$ between the desired trough 25 and the articles M can easily be obtained from the quantity of travel of the articles measured by actually driving the trough 25 for a predetermined time to transport the article M.

14 Claims, 8 Drawing Sheets

LINEAR CONVEYOR AND METHOD FOR CONTROLLING THE SAME

FIELD OF THE INVENTION

The present invention relates to a linear transport apparatus for transporting articles by driving a trough by means of a drive unit reciprocatingly in directions opposite to each other along a path of transport of articles placed on the trough.

BACKGROUND ART

Hitherto, linear transport apparatuses have been well known in the art for transporting articles by driving a trough reciprocatingly in directions opposite to each other along a path of transport of articles placed on the trough The linear transport apparatus is also known of a type wherein a linear motor (a drive unit) including a magnet and a stator comprised of an iron core having a primary winding wound therearound is used with the stator mounted on a base while the magnet is secured to an undersurface of the trough, on which articles to be transported are placed, in a manner spaced a predetermined distance from the stator, so that the trough can be reciprocatingly driven by the linear motor along a predetermined transport path to thereby transport the articles on the trough. See the Japanese Patent Publication No. 54-35395.

The operation of the above described linear transport apparatus to transport the articles is such that while at the outset the articles are placed on the trough, an electric power is supplied to a coil to activate the drive unit and the trough is moved in a forward direction at a advancing speed having a peak value generally insufficient to overcome a static frictional resistance (a static frictional force) of the articles relative to the trough. By so doing, the articles are moved in the forward direction together with the trough. Then, the drive unit is reversed to allow the trough to be moved in a rearward direction at a retracting speed having a peak value higher than the advancing speed so that the peak value can overcome the static frictional resistance of the articles relative to the trough. By so doing, the articles can slide relatively on the trough in the forward direction while bearing a kinetic frictional resistance (a kinetic frictional force) that is smaller than the static frictional resistance. The foregoing reciprocating movement of the trough is cyclically repeated to allow the articles to be successively transported along the direction of transport thereof.

During the relative movement between the trough and the articles in the manner described above, the kinetic frictional force F acts at respective surface areas of contact between the trough and the articles, which force F has a relationship of $F=\mu N$ wherein $\mu$ represents a coefficient of kinetic friction and N represents a force acting in a direction normal to the surface areas (a normal force). Specifically, the coefficient of kinetic friction $\mu$ means a ratio between the kinetic frictional force F, induced at the interface between the trough and the articles then held in a state of kinetic friction during which the articles undergo movement relative to the trough, and the normal force N. In such case, the coefficient of kinetic friction $\mu$ is smaller than the coefficient of static friction $\mu_0$. Where the articles are to be transported by reciprocatingly driving the trough, with the articles placed thereon, in the direction of transport of the articles, the coefficient of kinetic friction $\mu$ between the trough and the articles considerably affects the behavior of transport of the articles. Accordingly, it is required to obtain accurate value of coefficient of kinetic friction $\mu$.

However, with the prior art linear transport apparatus, it has been a practice to determine how to set a driving characteristic of the linear motor in dependence on a combination of the trough and the articles, that is, to determine how to drive the trough in reliance on the sense of operator or on the seat-of-the-pants of an experienced worker, and therefore, it has been difficult to control the apparatus so that the articles can be transported at a desired transport speed or in a desired transport quantity.

However, in the linear transport apparatus, it has hitherto been difficult to secure accurately the coefficient of kinetic friction $\mu$ between a desired trough and articles to be transported, and where the number of combinations of the troughs and the articles is great, the difficulty increases correspondingly. As a result, it has been still difficult to control the apparatus so that the articles can be transported at a desired transport speed or in a desired transport quantity.

The present invention has therefore been devised with the foregoing problems taken into consideration and is intended to provide a linear transport apparatus and a method of controlling the same, wherein the articles can easily be transported at a desired transport speed.

DISCLOSURE OF THE INVENTION

In order to accomplish the foregoing object, one aspect of the present invention provides transportation of articles by driving a trough by means of a drive unit reciprocatingly in directions opposite to each other along a path of transport of articles placed on the trough, wherein a plurality of trough displacement characteristics, each descriptive of a relationship between quantity of displacement of the trough and time, and drive signals for driving the drive unit are determined in association with each other, a position of the articles in a direction of transport thereof, which articles are transported by the trough having one of the trough displacement characteristics, is subsequently determined by using a given amplitude of the trough or a given magnitude of the trough stroke and a given coefficient of kinetic friction between the trough and the articles, a speed of transport of the articles is determined according to a time dependent change of the determined position of the articles, and one of the drive signals that is required to render the determined speed of transport of the article to attain a target speed is finally selected.

According to the foregoing construction, since the plural trough displacement characteristics and the drive signal for driving the drive unit of the trough are determined in association with each other and since the speed of transport of the articles transported by the trough having one of the trough displacement characteristics can therefore be determined, a plurality of relationships between the speed of transport of the articles and the drive signal for the drive unit can be determined and, based on these relationships, merely by inputting the target speed of the articles, the drive signal for the drive unit can easily be selected that is required for the speed of transport of the articles to attain the target speed.

Preferably, the position of the articles in the direction of transport thereof is determined by solving an equation of motion of the articles transported by the trough having such one of the trough displacement characteristics by utilization of the given amplitude of the trough and the given coefficient of kinetic friction between the trough and the articles. By so doing, the position of the articles with respect to the direction of transport can easily be determined by the use of the equation of motion of the articles transported by the trough.

In a preferred embodiment of the present invention, the quantity of transport of the articles is determined from a quantity of travel of the articles based on the determined speed of transport of the article and, in place of the selection of one of the drive signals that is required to render the determined speed of transport of the article to attain the target speed, one of the drive signals that is required to render the determined quantity of transport of the articles to attain a target transport quantity is selected.

According to this construction, since the determined quantity of transport of the articles can be determined based on the speed of transport of the articles, and in view of the relationship between the quantity of transport of the articles and the drive signal for the drive unit in dependence on the relationship between the speed of transport of the articles and the drive signal for the drive unit, mere inputting of the target quantity of transport of the article can facilitate an easy selection of the drive signal for the drive unit that is required to render the quantity of transport of the articles to attain the target quantity of transport.

Preferably, a plurality of trough speed characteristics are determined, each characteristics descriptive of a relationship between a trough displacement speed and time when parameters including the amplitude of the trough and an acceleration time of the trough during a forward transport path are changed, and the trough displacement speed is integrated with time to thereby determine the plurality of the trough displacement characteristics each descriptive of a relationship between the trough displacement quantity and the time. Accordingly, the trough displacement characteristics can easily be determined from the trough speed characteristics.

According to a second aspect of the present invention, while the articles are transported by driving a trough by means of a linear transport apparatus reciprocatingly in directions opposite to each other along a path of transport of articles placed on the trough, the coefficient of kinetic friction between the trough and the articles is determined, wherein the quantity of movement of the articles, transported by the trough, relative to the length of time during which the trough is driven is determined with the use of a plurality of coefficients of kinetic friction, induced between the trough and the articles, as a parameter, and a plurality of trough displacement characteristics, each descriptive of a relationship between a quantity of displacement of the trough and time, in association with drive signals for driving the drive unit are stored, and while the trough is actually driven for a predetermined time to transport the articles, the quantity of movement of the articles transported is measured so that the coefficient of kinetic friction required for the quantity of movement stored becomes equal to the quantity of movement measured can be determined from the displacement quantity characteristic.

According to this construction, since the displacement quantity characteristic is determined which is descriptive of a correspondence between the trough driving time and the quantity of movement of the articles with respect to each of the parameters of the plural coefficients of kinetic friction, the quantity of movement of the articles relative to the trough driving time with the plural coefficients of kinetic friction taken as the respective parameters can be grasped and, therefore, based on this a desired coefficient of kinetic friction can easily be obtained from the quantity of movement of the articles measured by actually driving the trough for the predetermined time to transport the articles.

The quantity of movement of the articles relative to the trough driving time can be obtained by solving the equation of motion of the articles transported by the trough, in which the plural coefficients of kinetic frictions given between the trough and the articles are taken as a parameter.

Preferably, in determining the above described quantity of movement, the trough is driven reciprocatingly under the same drive mode for each of the plural parameters. Accordingly, only one mode is sufficient for the drive mode to be used during actual measurement of the quantity of movement of the articles and, therefore, the coefficients of kinetic friction between the trough and the articles can further easily be determined.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

BEST MODE FOR CARRYING OUT THE INVENTION

Hereinafter, preferred embodiments of the present invention will be described with reference to the accompanying drawings.

Figure 1:
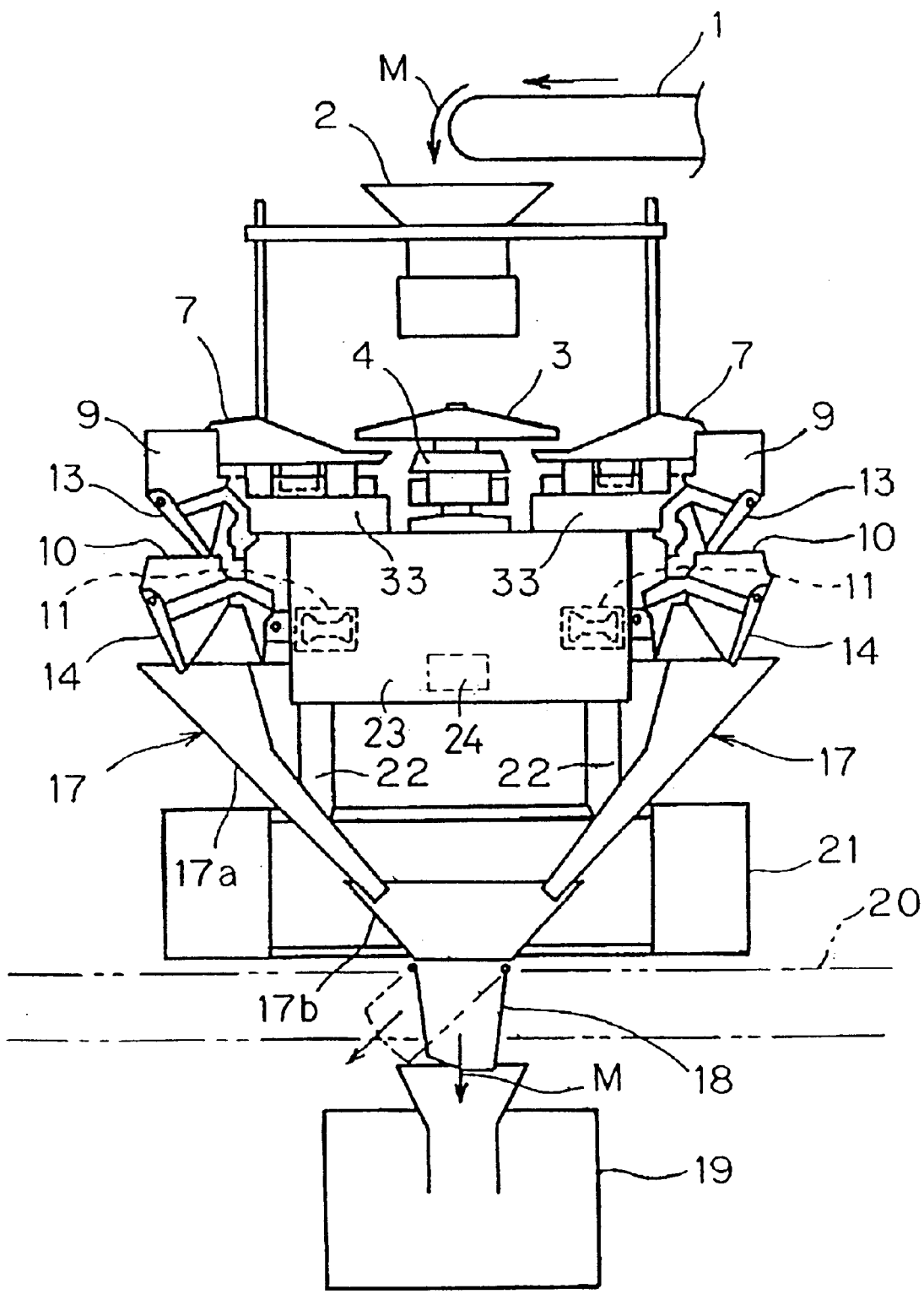
FIG. 1 is a schematic side view, with a portion cut out, of a combination weighing apparatus utilizing a linear transport apparatus according to a first preferred embodiment of the present invention.

FIG. 1 illustrates a schematic side view, with a portion cut out, of a combination weighing apparatus utilizing a linear transport apparatus according to a first preferred embodiment of the present invention. Referring now to FIG. 1, a mass of articles M such as, for example, a mass of snack foods to be weighed, which have been successively transported by means of a transport conveyor 1, are supplied onto a single dispensing feeder 3 of a generally flattened conical configuration through a drop-out chute 2. The dispensing feeder 3 is vibrated up and down by a vibrating unit 4 to dispense the articles M outwardly in all directions. A plurality of linear transport apparatuses (radial feeders) 7 are positioned generally below an outer peripheral portion of the dispensing feeder 3 and arranged in a radial pattern, and pool hoppers 9 are positioned generally below respective radially outer ends of the linear transport apparatuses 7 in a circular row aligned respectively with the linear transport apparatuses 7. Positioned generally below the pool hoppers 9 are weighing hoppers 10 arranged in a circular row aligned respectively with the pool hoppers 9.

Each of the linear transport apparatus 7 operates to supply the articles M, received from the dispensing feeder 3, to the corresponding pool hopper 9 when driven reciprocatingly in a horizontal direction, and the corresponding pool hopper 9 then supplies the articles, after the latter have been temporarily pooled therein, to the corresponding weighing hopper 10 through a gate 13 then opened.

Each of the weighing hopers 10 is supported by a casing 23 by means of a respective weighing means 11 such as, for example, a load cell for weighing the weight of the articles M within such weighing hopper 10. Thus, the pool hoppers 9, the weighing hoppers 10 and the weighing means 11 altogether constitute a weighing unit. Positioned below the weighing hoppers 10 is a collecting and discharge chute assembly 17 for collecting the articles M, discharged from the weighing hoppers 10, at a lower center portion of the assembly 17. The chute assembly 17 includes a plurality of removable upper stage chutes 17a and a fixed lower stage chute 17b. The upper stage chutes 17a are arranged radially outwardly of the fixed lower stage chute 17b so as to extend diagonally upwardly therefrom. The lower stage chute 17b has a lower discharge port for discharge of the articles M therethrough, which are, after having been collected by the collecting and discharge chute assembly 17, supplied through a sorting chute 18 towards a packaging machine 19 where they are packaged.

A machine frame 21 is mounted on a support bench 20 which is in turn supported on a floor not shown, and the casing 23 is supported on the machine frame 21 by means of a plurality of support legs 22. The drop-out chute 2, the dispensing feeder 3, the linear transport apparatuses 7 and the pool hoppers 9 are arranged above the casing 23, while the weighing hoppers 10 are arranged adjacent an outer periphery of the casing 23 and the weighing means 11 is accommodated within the casing 23. Within the casing 23, control units and drive motors for the pool hoppers 9 and the weighing hoppers 10 are also accommodated.

The control units 24 within the casing 23 are operable to perform a combination calculation of weighed values of the articles M within the plural weighing hoppers 10 to select a combination of the weighed values of the articles M within some of the weighing hoppers 10, which matches with a combined weight falling within a predetermined tolerance and then to open the gates 14 of such some of the weighing hoppers 10 to allow the articles within such some of the weighing hoppers 10 to be supplied towards the packaging machine 19.

Figure 2:
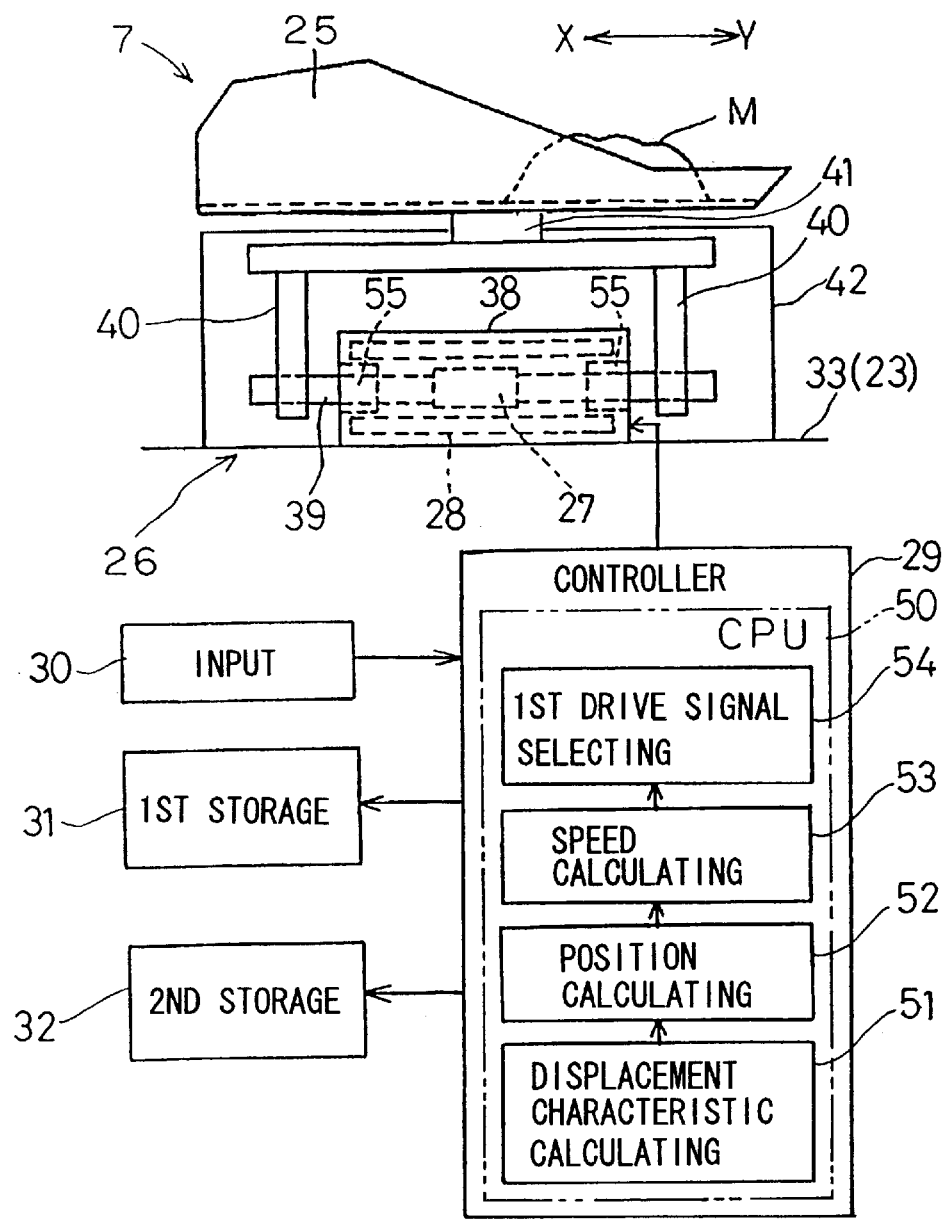
FIG. 2 is a block diagram showing a control system for the linear transport apparatus.

As shown in FIG. 2, each of the linear transport apparatus 7 includes a trough 25 on which the articles M to be transported are placed, and a drive unit 26 for driving the trough 25 reciprocatingly in a horizontal transport direction X-Y to transport the articles M towards the associated pool hopper 9 of the weighing unit. The drive unit 26 may be, for example, a linear stepping motor and includes a cylindrical housing 38, a coil 28 fixedly supported on an inner wall of the housing 38, a shaft 39 linearly movably extending within the housing 38 in a direction axially thereof and supported by front and rear linear bearings 55, and a magnet 27 fixed on the shaft 39. This drive unit 26 is mounted on a base 33 with the longitudinal axis of the shaft 39 oriented in a direction parallel to the transport direction X-Y The shaft 39 has front and rear ends connected with a generally U-shaped bracket 40 having an upper portion thereof connected with the trough 25 through a connecting member 41. Depending on the necessity, the drive unit 26 and the bracket 40 may be covered by a protective covering 42 of a design that will not interfere with reciprocating motion of the trough 25.

Figure 3:
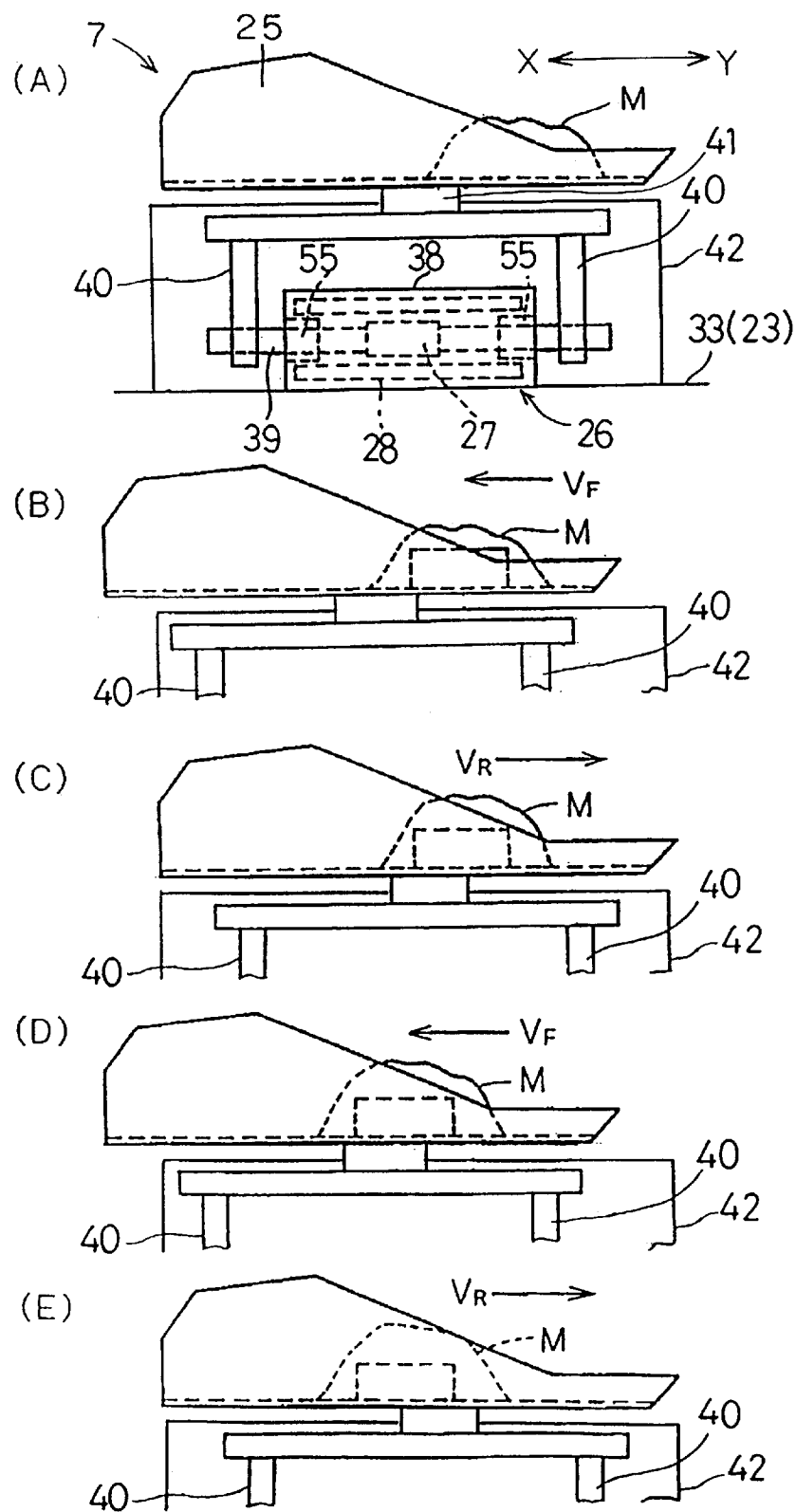
FIGS. 3(A) to 3(E) are explanatory diagrams showing the sequence of transport performed by the linear transport apparatus, respectively.

The operation of the linear transport apparatus 7 to transport the articles M takes place in a manner shown in FIG. 3. While the articles M are placed on the trough 25 as shown in FIG. 3(A), and when the drive unit 26 is subsequently activated as a result of supply of an electric power to the coil 28, the trough 25 is moved forwards (in a direction indicated by X) at a speed $V_F$ having a peak value sufficient not to overcome the static frictional resistance of the articles M relative to the trough 25. Accordingly, the articles M can move forwards together with the trough 25. It is to be noted that for the sake of brevity only a portion of the articles M is described.

In the next place, when the drive unit 26 is reversed, the trough 25 is, as shown in FIG. 3(C), moved rearwards (in a direction shown by the arrow Y) at a speed $V_R$ having a peak value higher than the advancing speed $V_F$ and sufficient to overcome the static frictional resistance of the articles M relative to the trough 25. Accordingly, the articles M can slide forwards relatively on the trough 25 while receiving a kinetic frictional resistance smaller than the static frictional resistance. Thereafter, by repeating the reciprocating motion of the trough 25 as shown in FIGS. 3(D) and 3(E), the articles M can be supplied onto the associated pool hopper 9 (FIG. 1) of the weighing unit at a radially outer end of the trough 25.

Also, the linear transport apparatus 7 shown in FIG. 2 includes a controller 29 for controlling the drive unit (linear motor) 26, an input means 30 for inputting a target speed of transport of the articles M to the controller 29, and first and second storage means 31 and 32. The first storage means 31 stores a plurality of trough displacement characteristics each descriptive of a relationship between time and displacement of the trough 25, in association with a corresponding drive signal for driving the drive unit 26. The second storage means 32 stores a plurality of trough speed characteristics each descriptive of a relationship between trough displacement speed and time when parameters as will be described later and including an amplitude of the trough 25 and the time of acceleration of the trough 25 on the forward transport path are changed. Also, the controller 29 has a CPU (a computer) 50 including a displacement characteristic calculating means 51, a position calculating means 52, a speed calculating means 53 and a first drive signal selecting means 54 and controls the drive unit 26 by outputting the drive signal so as to render the speed of transport of the articles M to attain a target speed.

Hereinafter, a method of controlling the linear transport apparatus 7 of the structure described above will be discussed.

In the first place, the drive signal (a drive mode) for the trough 25 of the linear transport apparatus 7 is generated in the computer 50. The parameters used in the drive signal for driving the trough 25 include a forward run frequency, a forward run self-starting frequency, a rearward run frequency, a rearward self-starting frequency, a forward run acceleration time, a forward run deceleration time, a rearward run acceleration time, a rearward run deceleration time and the stroke of reciprocating motion of the trough 25, a total of nine parameters. It is to be noted that the forward run means a forward displacement, the rearward run means a rearward displacement, and the self-starting frequency represents the frequency at the time the trough 25 starts its movement in response to the drive signal supplied to the drive unit 26. By varying a combination of these parameters, a plurality of trough speed characteristics each descriptive of a relationship between the trough displacement speed and the time are generated. These can be generated for each of the combinations of the parameters by causing the computer 50 to execute a drive mode program. These trough speed characteristics are stored in the second storage means 32.

In the illustrated example, since the number of combinations of the parameters is extremely great ($2^9$ combinations available), these parameters are weighted according to the consequence of influence of the parameters on the transport of the articles M. By way of example, when a forward run trough speed characteristics is prepared, in addition to the parameter of amplitude of the trough 25, a combination of the parameters such as the forward run self-starting frequency, the forward run acceleration time and the forward run frequency is varied. By these parameters such as the forward self-starting frequency, the forward acceleration time and the forward run frequency, a ramp of the forward transport speed (shown by 61 in FIG. 4), that is, the acceleration on the forward transport path can be determined. The parameters for the rearward transport path are fixed to a predetermined value indicative of a maximum performance of the linear motor 26.

Figure 4:
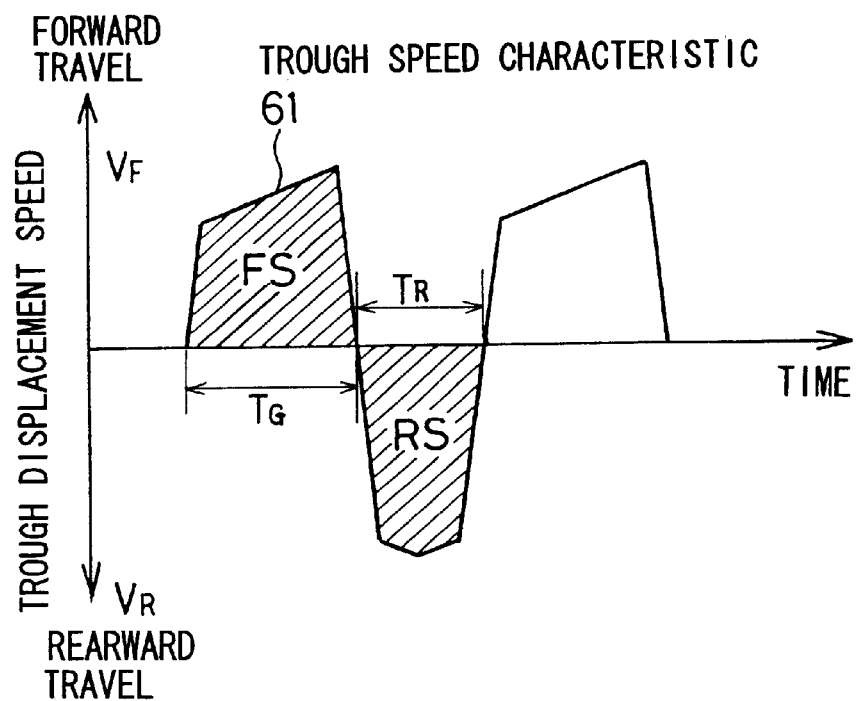
FIG. 4 is a characteristic chart showing one example of a trough speed characteristic of the linear transport apparatus.

FIG. 4 illustrates one example of the plural trough speed characteristics so generated. An upper portion of the axis of ordinates above the axis of abscissas represents a forward speed $V_F$ whereas a lower portion of the axis of ordinates below the axis of abscissas represents a rearward speed $V_R$. The waveform shown therein is a non-sinusoidal wave, and the peak value of the rearward speed $V_R$ is chosen to be greater than the peak value of the forward speed $V_F$. It is to be noted that in this figure, the area of a portion encompassed by the respective waveform of the forward speed $V_F$ and the rearward speed $V_R$ and the time axis (axis of abscissas) (i.e., time integral value of the waveform) represents the stroke of reciprocating motion of the trough 25, that the area FS of a portion of the forward speed $V_F$ is equal to the area RS of a portion of the rearward speed $V_R$, and that the time width $T_F$ of the waveform of the forward speed $V_F$ of which the peak value is small is longer than the time width $T_R$ of the waveform of the rearward speed $V_R$ of which peak value is large.

Figure 5:
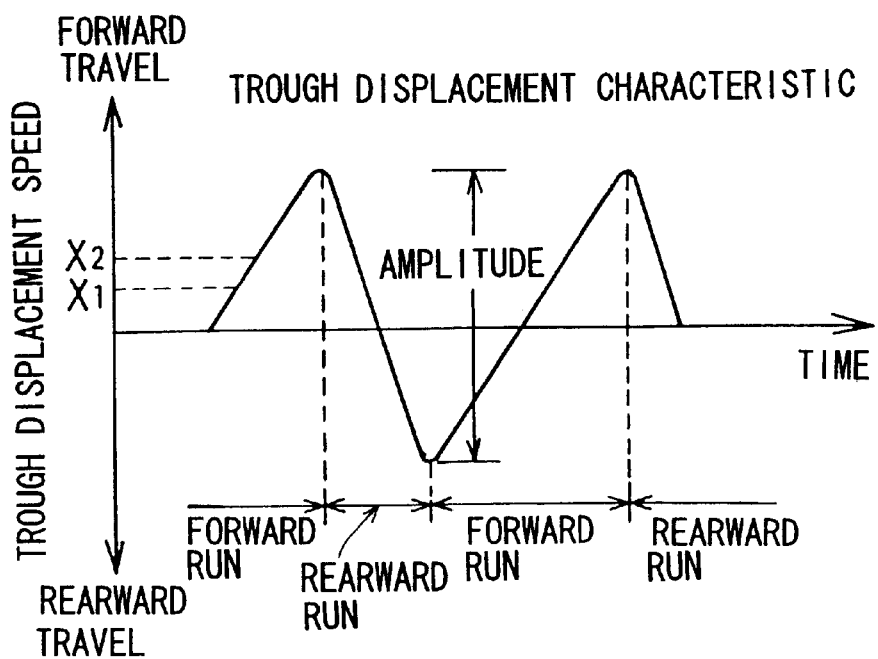
FIG. 5 is a characteristic chart showing one example of a trough displacement characteristic of the linear transport apparatus.
Figure 6:
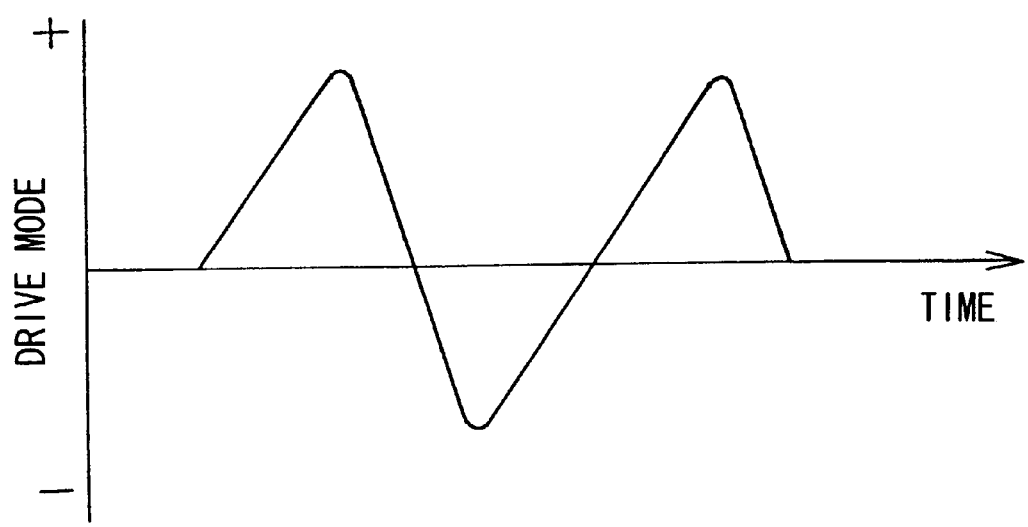
FIG. 6 is a characteristic chart showing one example of a drive signal used in the linear transport apparatus.

The displacement characteristic calculating means 51 shown in FIG. 2 determines the trough displacement characteristics each descriptive of the relationship between the quantity of displacement of the trough and the time by time integrating the trough displacement speed on the basis of the trough speed characteristic shown in FIG. 4. FIG. 5 illustrates one example of a plurality of trough displacement characteristics so determined. The axis of ordinates represents the quantity of displacement of the trough and the axis of abscissas represents time. In this figure, the time of rearward travel is shorter than the time of forward travel and is chosen, for example, to 1/2 of the time of forward travel. These plural trough displacement characteristics are stored in the first storage means 31. Each of those trough displacement characteristics corresponds to a driving characteristic of the drive unit (linear motor) 26 driven by the drive signal (drive mode) shown in FIG. 6 and outputted from the controller 29. The drive signal for the drive unit 26 is generated in reference to the magnitude and frequency of an electric power supplied to the coil 28 and the length of time during which the electric power is supplied and can be determined immediately once the trough displacement characteristic is grasped. In this way, the drive signal for driving the trough 25 of the linear transport apparatus 7 is generated.

The position calculating means 52 makes use of a given amplitude of the trough 25 and a given coefficient of kinetic friction $\mu$ (v) between the trough 25 and the articles M (where v represents a speed of the articles relative to the trough) to solve the following equation (1) of motion of the articles M transported by the trough 25 having the trough displacement characteristic shown in FIG. 5, to thereby determine the position in the direction of transport of the articles M. Although in this example, the coefficient of kinetic friction $\mu$ (v) is fixed to a predetermined value, it may be a value variable according to the speed of transport of the articles M.

In the equation (1), x represents the position of the articles M, m represents a mass of the articles M, g represents a gravitational acceleration, X represents the position of the trough 25 and t represents time.

$$m\frac{d^2x}{dt} = \mu(v) \cdot mg \cdot \frac{\frac{dx}{dt} - \frac{dX}{dt}}{\sqrt{\left(\frac{dx}{dt} - \frac{dX}{dt}\right)^2}} \quad (1)$$

More specifically, if it is assumed that the trough 25 is driven based on the trough displacement characteristic shown in FIG. 4, the value of the speed $dX_0/dt$ of the trough 25 when the trough 25 is held at a position $X_0$ on its forward travel path of the trough 25 is determined and then substituted for dX/dt in Equation (1) to thereby determine $d^2x_1/dt^2$, which is subsequently integrated once to determine the speed $dx_1/dt$ of the articles M and integrated twice to determine the position $x_1$ of the articles M. In such case, the initial condition is $x_0=0$ and $dx_0/dt=0$.

Thereafter, the value of the speed $dX_1/dt$ of the trough 25 when the trough 25 is held at a position $X_1$ on its forward travel path of the trough 25 is determined and then substituted for dX/dt in Equation (1) to thereby determine $d^2x_2/dt^2$ using the $dx_1/dt$ so obtained previously, which is subsequently integrated once to determine the speed $dx_2/dt$ of the articles M and integrated twice to determine the position $x_2$ of the articles M. By repeating this procedure, the position of the articles M can be successively determined. Thus, a displacement characteristic of the articles M is obtained.

The speed calculating means 53 determines the speed of transport of the articles M by dividing the quantity of displacement of the articles M at the time of completion of one reciprocating motion of the trough 25 by the length of time required to complete one reciprocating motion of the trough 25. In other words, the speed of transport of the articles M is determined from change in position of the articles M with passage of time for each reciprocating motion of the trough 25. The speed of transport of the articles M so determined represents that of the articles M transported by the trough 25 having the respective trough displacement characteristic and, therefore, the relationship between each of the plural trough displacement characteristics and the speed of transport of the articles M can also be determined. The relationships between the speed of transport of the articles M and the trough displacement characteristics are stored in the first storage means 31. Accordingly, since the first storage means 31 stores the trough displacement characteristics in association with respective drive signals for driving the drive unit 26, a number of relations between the speed of transport of the articles M and the drive signals of the drive unit 26 are stored. It is, however, to be noted that the relations between the speed of transport of the articles M and the drive signal of the drive unit 26 may be stored in any other storage means.

The first drive signal selecting means 54 is operable to select the drive signal of the drive unit 26 in reference to the relation between the speed of transport of the articles M, and the drive signal of the drive unit 26 stored in the first storage means 31, so that in response to input of a target speed of the articles M from the input means 30, the speed of transport of the articles M so determined can attain the target speed. In other words, the drive signal of the drive unit 26 corresponding to the speed of transport of the articles M which is most approximate to the target speed of the articles M is selected. The drive signal of the drive unit 26 so selected is outputted from the controller 29 to the drive unit 26 to thereby control the speed of transport of the articles M to attain the target speed.

Figure 7:
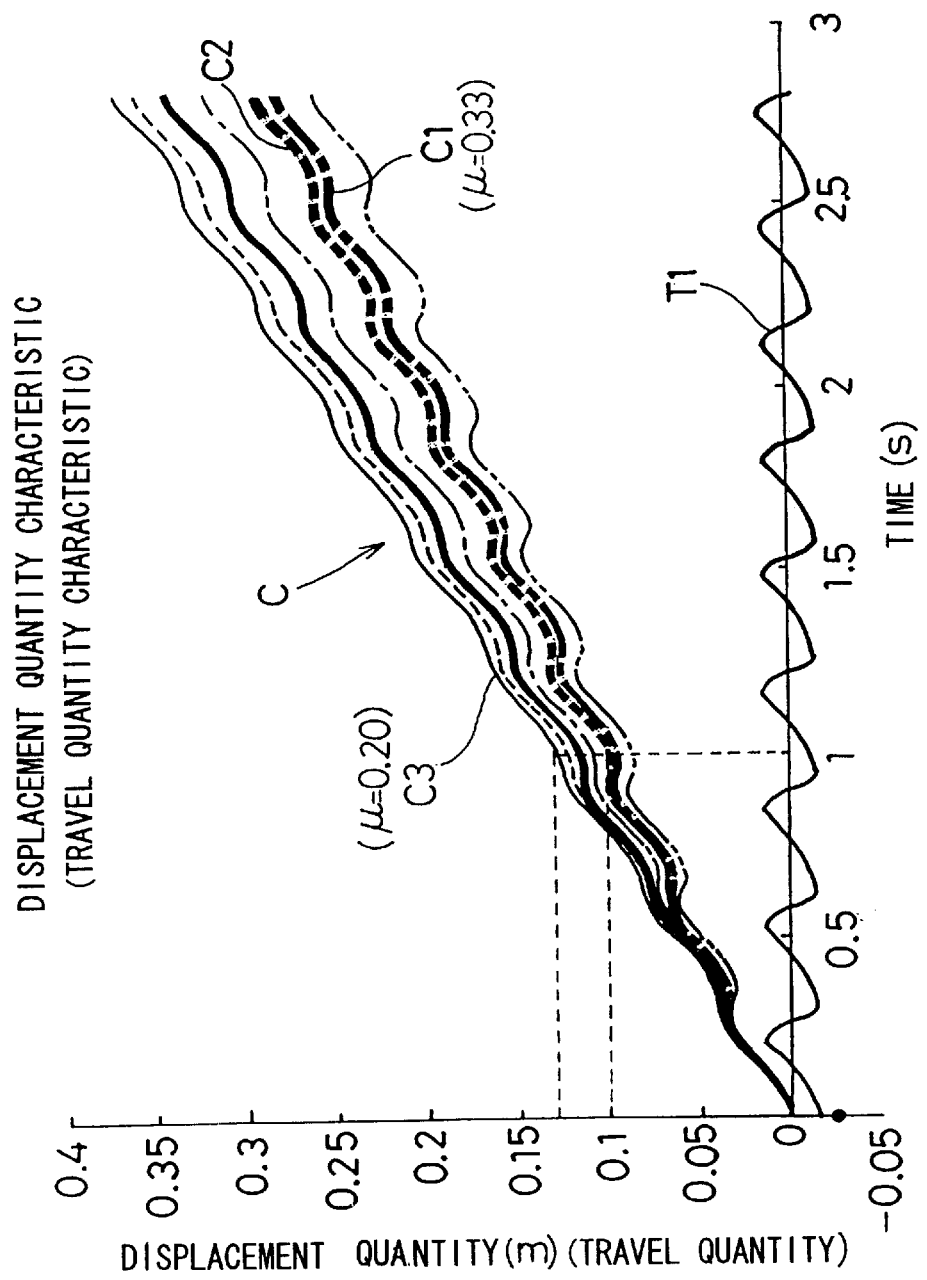
FIG. 7 is a characteristic chart showing one example of a transport operation performed by the linear transport apparatus.

FIG. 7 illustrates one of the trough displacement characteristics T1 and examples of a plurality of displacement characteristics C (C1, C2, . . . ) of the articles M calculated from the one trough displacement characteristics T1. The axis of ordinates represents the displacement quantity and the axis of abscissas represents time. This figure is applicable where while the amplitude of the trough 25 is fixed, the coefficient of kinetic friction $\mu$ (v) takes various values. Once the displacement characteristic of the articles M that corresponds to the target speed of the articles M inputted is obtained in the manner hereinbefore described, one of the displacement characteristics C of the articles M which is closest to such obtained characteristic, for example, the displacement characteristic C2, is selected.

In this way, since the plural trough displacement characteristics can be determined in association with the drive signals for driving the drive unit 26 and the speed of transport of the articles M transported by the trough 25 having the particular trough displacement characteristic has been already determined as mentioned above, a number of relationships between the speed of transport of the articles M and the drive signal of the drive unit 26 can be determined and, based on these relationships, the drive signal of the drive unit 26 that is required to render the speed of transport of the articles M to attain the target speed can be easily selected merely by inputting the target speed of the articles M through the input means 30.

Figure 8:
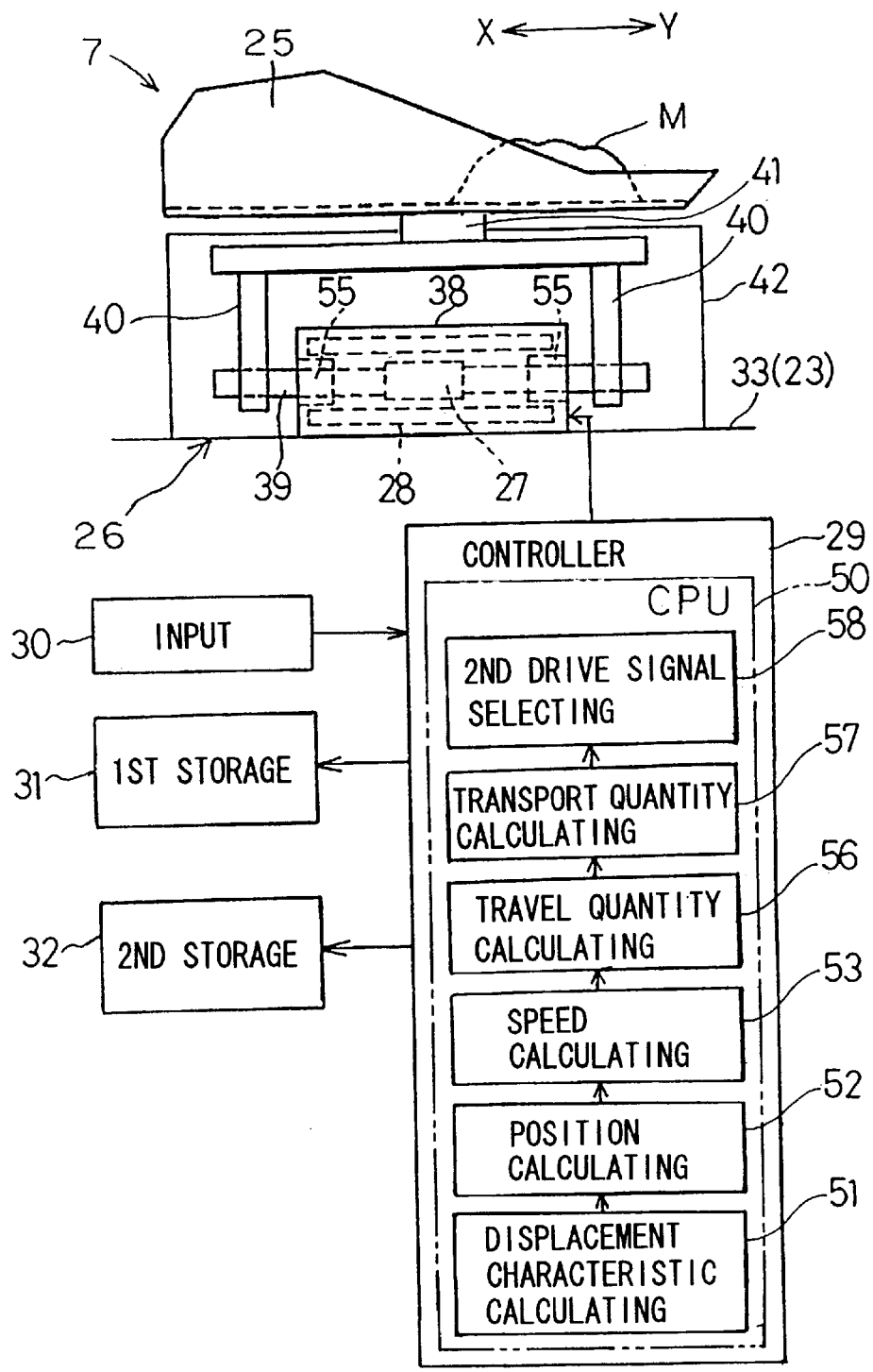
FIG. 8 is a block diagram showing the control system for the linear transport apparatus according to a second preferred embodiment of the present invention.

FIG. 8 illustrates a second preferred embodiment. This embodiment is such that, unlike the first embodiment in which the speed of transport of the articles M is controlled to attain the target speed, the quantity of the articles M to be transported is controlled to attain a target transport quantity.

In this linear transport apparatus, the controller 29 includes the computer 50 which includes, in addition to the component parts shown in FIG. 2, a travel quantity calculating means 56 and a transport quantity calculating means 57 with a second drive signal selecting means 58 employed in place of the first drive signal selecting means 54 shown in FIG. 2.

The travel quantity calculating means 56 is operable to determine the amount of movement of the articles M based on the speed of transport of the articles M so determined in the manner described above. The transport quantity calculating means 57 is operable to determine the quantity of transport of the articles M by multiplying the amount of movement so determined by the weight of the articles M per unitary length thereof. Since the quantity of transport of the articles M so determined was determined based on the previously described speed of transport of the articles M, a relationship between the quantity of transport of the articles M and the drive signal of the drive unit 26 can also be determined from the relationship between the previously described speed of transport of the articles M and the drive signal of the drive unit 26. The relationship between the quantity of transport of the articles M and the drive signal of the drive unit 26 is stored in the first storage means 31.

The second drive signal selecting means 58 is operable to determine the drive signal of the drive unit 26 from a plurality of relationships between the quantity of transport of the articles M and the drive signal of the drive unit 26, which are stored in the first storage means 31, so that the determined quantity of transport of the articles M can attain a target transport quantity that has been inputted from the input means 30. The drive signal of the drive unit 26 so determined is outputted from the controller 29 to the drive unit 26 to thereby control the quantity of transport of the articles M to attain the target transport quantity.

In this way, based on the relationship between the quantity of transport of the articles M and the drive signal of the drive unit 26 which have been determined and stored, merely by inputting the target quantity of transport of the articles M, the drive signal of the drive unit 26 can easily be determined so that the quantity of transport of the articles M can attain the target transport quantity.

Figure 9:
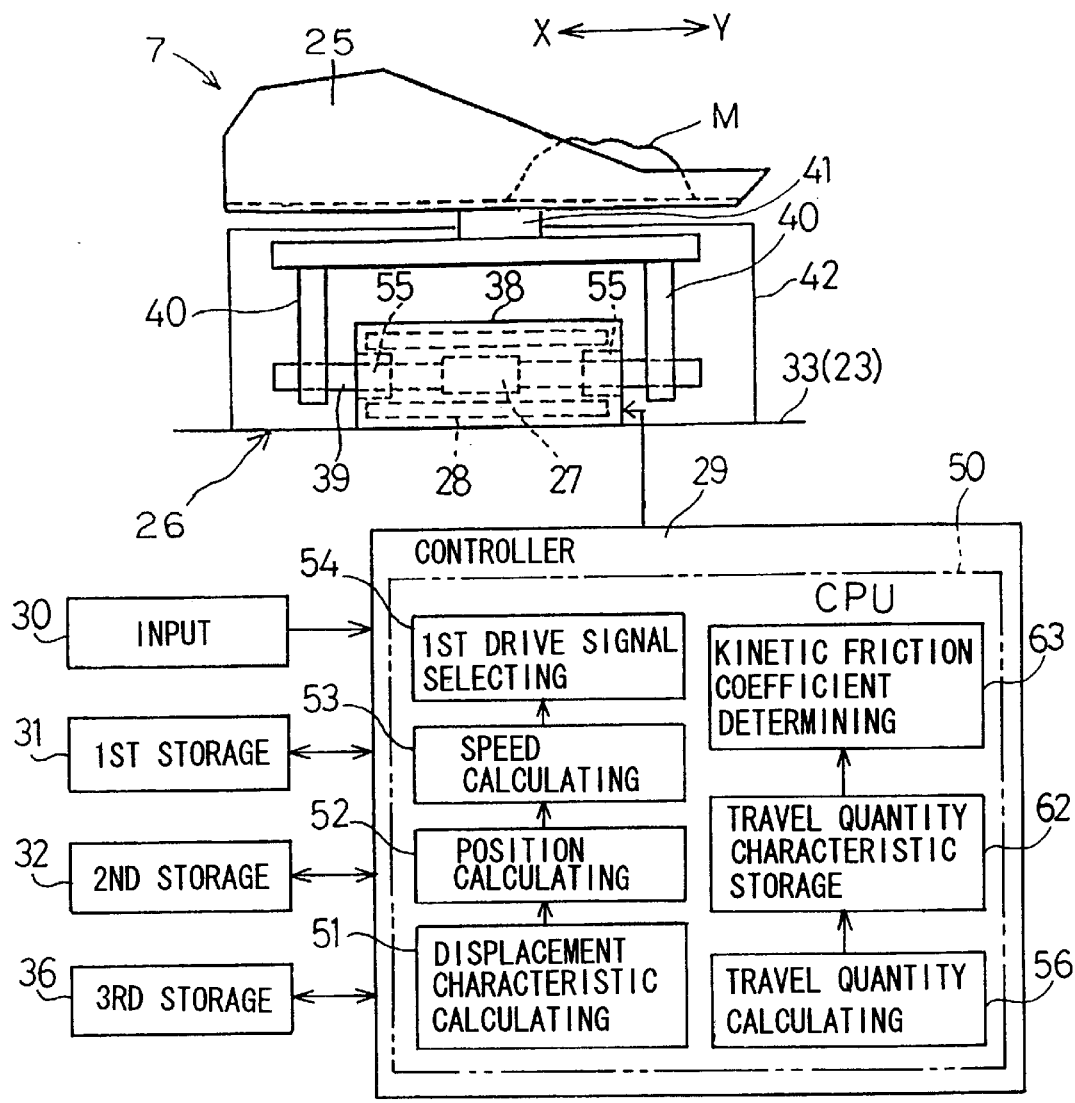
FIG. 9 is a structural diagram showing an apparatus for determining a coefficient of kinetic friction between a trough and articles in the linear transport apparatus according to a third preferred embodiment of the present invention.

FIG. 9 illustrates a structural diagram showing an apparatus for determining a coefficient of kinetic friction between the trough and the articles in the linear transport apparatus according to a third preferred embodiment of the present invention. This apparatus is of a design in which the computer 50 of the controller 29 includes a travel quantity calculating means 56, a travel quantity characteristic storage means 62 such as, for example, a memory, and a kinetic frictional coefficient determining means 63, in combination with a third storage means 36. Other structural features of the linear transport apparatus 7 are substantially identical with those shown in FIG. 2.

Referring to FIG. 9, so long as the relative movement occurs between the previously described trough 25 and the articles M, the kinetic frictional force F at the surface of contact between the articles and the trough, the orthogonal drag force N, and the coefficient of kinetic friction $\mu$ have a relationship of F=$\mu$N. In this third embodiment, determined is the coefficient of kinetic friction $\mu$ developed between the trough 25 and the articles M at the time of transport of the articles M by reciprocatingly driving the trough 25, with the articles M placed thereon, in a direction of transport of the articles M.

In the first place, as is the case with the first embodiment, the drive signal (drive mode) of the trough 25 of the linear transport apparatus 7 is generated in the computer 50. In other words, by varying various combinations of the parameters used for the drive mode, the plurality of the trough speed characteristics each descriptive of the relationship between the trough displacement speed and the time such as shown in FIG. 4 are generated. In the next place, based on the trough speed characteristic shown in FIG. 4, the trough displacement characteristics each descriptive of the trough displacement quantity and the time such as shown in FIG. 5 are determined. Considering that the trough displacement characteristic corresponds to a driving characteristic of the drive unit (linear motor) 26 that is driven by the drive mode shown in FIG. 6 and outputted from the controller 29, the drive mode of the drive unit 26 can be generated based on the magnitude and frequency of an electric power supplied to the coil 28 and the length of time during which the electric power is supplied and can be determined immediately once the trough displacement characteristic is grasped. In this way, the drive mode of the trough 25 of the linear transport apparatus 7 can be generated. This drive mode is stored in the third storage means 36 shown in FIG. 9.

In the next place, the quantity of travel of the articles M relative to the driving time of the trough 25 is determined by the travel quantity calculating means 56. In other words, as is the case with the first embodiment, Equation (1) of motion described previously of the articles M transported by the trough 25 having such a trough displacement characteristic as shown in FIG. 5 is solved with respect to a plurality of coefficients of kinetic friction $\mu$ (v) between the given trough 25 and the articles M, with the coefficients of kinetic friction $\mu$ (v) used as parameters, to thereby determine the position of the articles M in the direction of transport thereof.

Then, by differentiating the determined position of the articles M with respect to time, the speed of transport of the articles M is determined. Finally, based on the determined speed of transport of the articles M, the quantity of travel of the articles M is determined. In this way, the quantity of travel of the articles M can be determined relative to the driving time of the trough 25 with respect to the parameters of the plural coefficients of kinetic friction $\mu$.

The travel quantity characteristic storage means 62 is operable to store the travel quantity characteristics each descriptive of correspondence between the driving time and the quantity of travel of the articles M determined against each of the parameters of the plural coefficients of kinetic friction $\mu$.

In view of the foregoing, the quantity of travel of the articles M relative to the driving time of the trough 25 can be determined, in which the plural coefficients of kinetic friction $\mu$ are taken as a parameter in reference to the trough displacement characteristic (T1), shown in FIG. 7, and the plurality of the displacement quantity (travel quantity) characteristics C (C1, C2, . . . ) obtained by the previously described calculation. By way of example, in the travel quantity characteristic C3 having the coefficient of kinetic friction $\mu$ of 0.20, the quantity of travel of the articles M after one second is 130 mm (0.13 m), whereas in the travel quantity characteristic C1 having the coefficient of kinetic friction $\mu$ of 0.33, the quantity of travel of the articles M after one second is 100 min (0.1 m).

Thereafter, using the linear transport apparatus 7 shown in FIG. 9, the quantity of travel of the articles M transported when the trough 25 is actually driven for a predetermined time is measured. At this time, the drive mode of the trough 25 is identical with that when the travel quantity characteristics C of the articles M are determined. The actually measured travel quantity is inputted by means of the input means 30 to the kinetic frictional coefficient determining means 63. The kinetic frictional coefficient determining means 63 is operable to determine from the travel quantity characteristics C of the articles M shown in FIG. 7, such a coefficient of kinetic friction $\mu$ that the quantity of travel of the articles M, which are transported when the trough 25 is actually driven for a predetermined time (for example, one second), inputted from the inputting means 30, and the travel quantity of the travel quantity characteristics determined theoretically and stored in the travel quantity characteristic storage means 62 can become equal to each other. By way of example, if the actually measured quantity of travel of the article M is 100 mm after one second, the coefficient of kinetic friction $\mu$ of 0.33 can be immediately determined from the travel quantity characteristics C shown in FIG. 7. In this way, the coefficient of kinetic friction $\mu$ between the desired trough 25 and the articles M can easily be determined.

It is to be noted that although in this embodiment the trough 25 is reciprocatingly driven under the same drive mode when the quantity of travel of the articles M is to be determined, it may be reciprocatingly driven under a different drive mode by, for example, varying the amplitude of the trough 25. In such case, it is necessary to determine an actual quantity of travel of the articles M under the different drive mode.

Although in any one of the foregoing embodiments, the linear stepping motor is used for each of the drive units of the linear transport apparatuses, any other linear motor or a combination of the standard motor with one or more cam rings may be employed therefore. Also, the linear transport apparatus of the present invention is applied not only to the combination weighing apparatus, but also to any other apparatus for transporting a predetermined quantity of articles.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A method of controlling a linear transport apparatus for transporting articles by driving a trough by means of a drive unit reciprocatingly in directions opposite to each other along a path of transport of articles placed on the trough, said method comprising the steps of:

determining a plurality of trough displacement characteristics, each descriptive of a relationship between quantity of displacement of the trough and time, and drive signals for driving the drive unit in association with each other;

determining a position of the articles in a direction of transport thereof, which articles are transported by the trough having one of the trough displacement characteristics, by using a given amplitude of the trough and a given coefficient of kinetic friction between the trough and the articles;

determining a speed of transport of the articles according to a time dependent change of the determined position of the articles; and selecting one of the drive signals that is required to render the determined speed of transport of the article to attain a target speed.

2. The method of controlling the linear transport apparatus as claimed in claim 1, wherein the position of the articles in the direction of transport thereof is determined by solving an equation of motion of the articles transported by the trough having such one of the trough displacement characteristics by utilization of the given amplitude of the trough and the given coefficient of kinetic friction between the trough and the articles.

3. The method of controlling the linear transport apparatus as claimed in claim 1, further comprising a step of determining the quantity of transport of the articles from a quantity of travel of the articles based on the determined speed of transport of the article and, wherein, in place of the step of selecting one of the drive signals that is required to render the determined speed of transport of the article to attain the target speed, a step of determining one of the drive signals that is required to render the determined quantity of transport of the articles to attain a target transport quantity is employed.

4. The method of controlling the linear transport apparatus as claimed in claim 1, further comprising a step of determining a plurality of trough speed characteristics each descriptive of a relationship between a trough displacement speed and time when parameters including the amplitude of the trough and an acceleration time of the trough during a forward transport path are changed; and a step of integrating the trough displacement speed with time to thereby determine the plurality of the trough displacement characteristics each descriptive of a relationship between the trough displacement quantity and the time.

5. A linear transport apparatus for transporting articles by driving a trough by means of a drive unit reciprocatingly in directions opposite to each other along a path of transport of articles placed on the trough, said apparatus comprising:

a first storage means for storing a plurality of trough displacement characteristics, each descriptive of a relationship between a quantity of displacement of the trough and time, in association with drive signals for driving the drive unit;

a position calculating means for determining a position of the articles in a direction of transport thereof, which articles are transported by the trough having one of the trough displacement characteristics, by using a given amplitude of the trough and a given coefficient of kinetic friction between the trough and the articles;

a speed calculating means for determining a speed of transport of the articles according to a time dependent change of the determined position of the articles; and a first drive signal selecting means for selecting one of the drive signals that is required to render the determined speed of transport of the articles to attain a target speed.

6. The linear transport apparatus as claimed in claim 5, wherein the position calculating means determines the position of the articles in the direction of transport thereof by solving an equation of motion of the articles transported by the trough having such one of the trough displacement characteristics by utilization of the given amplitude of the trough and the given coefficient of kinetic friction between the trough and the articles.

7. The linear transport apparatus as claimed in claim 5, further comprising a transport quantity calculating means for determining the quantity of transport of the articles from a quantity of travel of the articles based on the determined speed of transport of the article and, wherein, in place of the first drive signal selecting means, a second drive signal selecting means is employed for determining one of the drive signals that is required to render the determined quantity of transport of the articles to attain a target transport quantity.

8. The linear transport apparatus as claimed in claim 5, further comprising a second storage means for storing a plurality of trough speed characteristics each descriptive of a relationship between a trough displacement speed and time when parameters including the amplitude of the trough and an acceleration time of the trough during a forward transport path are changed; and a displacement characteristic calculating means for integrating the trough displacement speed with time to thereby determine the plurality of the trough displacement characteristics each descriptive of a relationship between the trough displacement quantity and the time.

9. A method of determining a coefficient of kinetic friction between a trough and articles when the articles placed on the trough are transported by the trough by driving the trough reciprocatingly in directions opposite to each other along a path of transport of the articles, said method comprising the steps of:

determining a quantity of travel of the articles being transported by the trough relative to a driving time of the trough, with a plurality of coefficients of kinetic friction imposed between the trough and the articles being taken as parameters;

storing a travel quantity characteristic indicative of a correspondence between the quantity of travel of the articles, which has been determined against the plural parameters, and the driving time;

transporting the articles by actually driving the trough for a predetermined time;

measuring the quantity of travel of the articles transported; and determining the coefficient of kinetic friction between the articles and the trough that is determined from the travel quantity characteristic, which coefficient of kinetic friction is such as to enable the travel quantity stored becomes equal to the travel quantity measured.

10. The method of determining the coefficient of kinetic friction between the trough and the articles as claimed in claim 9, wherein the quantity of travel of the articles relative to the driving time of the trough is determined by solving an equation of motion of the articles transported by the trough, using a plurality of coefficients of kinetic friction imparted between the trough and the articles taken as a parameter.

11. The method of determining the coefficient of kinetic friction between the trough and the articles as claimed in claim 9, wherein when the travel quantity is to be determined, the trough is driven under same drive mode with respect to the plural parameters.

12. An apparatus for determining a coefficient of kinetic friction between a trough and articles when the articles placed on the trough are transported by the trough by driving the trough reciprocatingly in directions opposite to each other along a path of transport of the articles, said apparatus comprising:

a travel quantity calculating means for determining a quantity of travel of the articles being transported by the trough relative to a driving time of the trough, with a plurality of coefficients of kinetic friction imparted between the trough and the articles being taken as parameters;

a transport quantity characteristic storage means for storing a travel quantity characteristic indicative of a correspondence between the quantity of travel of the articles, which has been determined against the plural parameters, and the driving time;

a kinetic frictional coefficient determining means for determining the coefficient of kinetic friction between the articles and the trough that is determined from the travel quantity characteristic, which coefficient of kinetic friction is such as to enable the travel quantity stored becomes equal to the travel quantity measured.

13. The apparatus for determining the coefficient of kinetic friction between the trough and the articles as claimed in claim 12, wherein the travel quantity calculating means determines the quantity of travel of the articles relative to the driving time of the trough by solving an equation of motion of the articles transported by the trough, using a plurality of coefficients of kinetic friction imparted between the trough and the articles taken as a parameter.

14. The apparatus for determining the coefficient of kinetic friction between the trough and the articles as claimed in claim 12, wherein when the travel quantity is to be determined, the trough is driven under a same drive mode for each of the plural parameters.

* * * * *